United States Patent
Hsu (10) Patent No.: US 9,148,047 B2
(45) Date of Patent: Sep. 29, 2015

(54) COIL ASSEMBLY HAVING SEPARATION PLATES FOR IRON LESS LINEAR MOTOR

(71) Applicant: CHIEFTEK PRECISION CO., LTD., Tainan (TW)

(72) Inventor: Ming-che Hsu, Tainan (TW)

(73) Assignee: CHIEFTEK PRECISION CO., LTD., Tainan (TW)

( * ) Notice: Subject to any disclaimer, the term of this patent is extended or adjusted under 35 U.S.C. 154(b) by 427 days.

(21) Appl. No.: 13/691,601

(22) Filed: Nov. 30, 2012

(65) Prior Publication Data

US 2014/0152124 A1 Jun. 5, 2014

(51) Int. Cl.
- H02K 41/02 (2006.01)
- H02K 41/03 (2006.01)
- H02K 3/04 (2006.01)
- H02K 3/47 (2006.01)
- H02K 9/22 (2006.01)

(52) U.S. Cl.
CPC ............... *H02K 41/031* (2013.01); *H02K 3/04* (2013.01); *H02K 3/47* (2013.01); *H02K 9/22* (2013.01); *H02K 2213/03* (2013.01)

(58) Field of Classification Search
CPC ....... H02K 33/16; H02K 33/18; H02K 41/02; H02K 41/031

USPC ................ 310/12.21, 12.22, 64, 65
See application file for complete search history.

(56) References Cited

U.S. PATENT DOCUMENTS

| | | | | |
|---|---|---|---|---|
| 5,744,896 A | * | 4/1998 | Kessinger et al. | 310/268 |
| 5,831,352 A | * | 11/1998 | Takei | 310/12.21 |
| 6,140,734 A | * | 10/2000 | Hazelton et al. | 310/12.22 |
| 6,265,793 B1 | * | 7/2001 | Korenaga | 310/12.06 |

* cited by examiner

*Primary Examiner* — Michael Andrews
(74) *Attorney, Agent, or Firm* — Muncy, Geissler, Olds & Lowe, P.C.

(57) ABSTRACT

A coil unit and coil assembly for iron-less liar motor and the coil unit includes two vertical function sides and two axial non-function sides. The multiple units are alternatively connected to each other by inserting the vertical function side of one coil unit into the hollow portion of the adjacent coil unit so as to form a coil assembly. The width of the vertical function side is D1 and the distance between two respective insides of the two vertical function sides is D2. $D2 = m \times D1 + \Delta L$, wherein m representing the number of the vertical function sides of other coil units received in the vertical direction of the hollow portion. The $\Delta L$ is the width of the gap which receives a separation plate between the two adjacent vertical function sides to increase the efficiency of dissipating heat or insulation when current passes through the coil assembly.

19 Claims, 10 Drawing Sheets

US 9,148,047 B2

COIL ASSEMBLY HAVING SEPARATION PLATES FOR IRON LESS LINEAR MOTOR

FIELD OF THE INVENTION

The present invention relates to a coil unit and coil assembly for iron-less linear motor, and more particularly, to coil units alternatively arranged to each other and the hollow portion of each of the coil units has a gap for receiving a separation plate to increase the efficiency for dissipating heat or insulation.

BACKGROUND OF THE INVENTION

Figure 17:
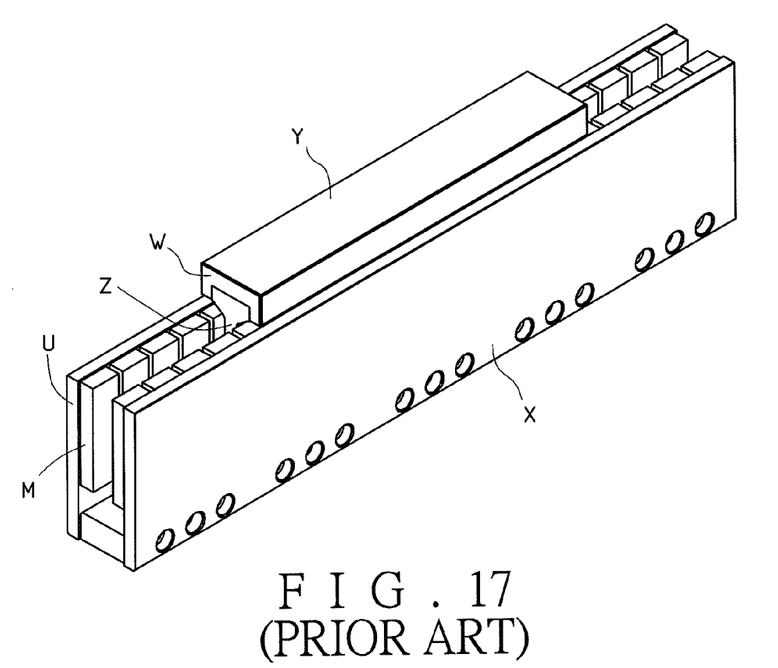
FIG. 17 shows the conventional linear motor.
Figure 18:
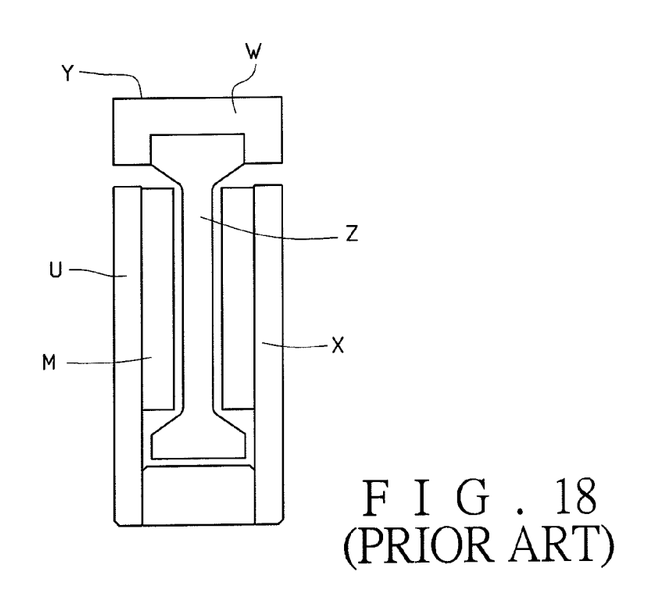
FIG. 18 shows the front view of the linear motor in FIG. 17.

The conventional iron-less linear motor is disclosed in FIGS. 17 and 18 and comprises a stator X and a coil assembly Y which moves along the rail of the stator X. The stator X is composed of multiple permanent magnets M which are arranged in alternative pattern with gaps located there between so as to form the U-shaped rail having alternating N and S polarities. The coil assembly Y has multiple coil loops which are arranged to form the coil unit and the current with multiple phases is input, such as the well known three-phase coil unit. The coil unit has a resin package layer Z mounted thereto and installed in the recess of the board W.

Taiwan Patent Application No. 201126875 discloses a coil unit of a linear motor wherein the coil unit comprises multiple adjacent coil units, a base and a resin package layer. These coil loops form two linear function sides, a first non-function side and a second non-function side. The coil loops form multiple first bent sections which are alternative to each other on the first non-function side, and multiple conductive lines on the second non-function side. These conductive lines are connected to the exterior cables located outside of the coil unit. The base has a slot whose cross section is correspondent to the cross section of the first bent section. The coil loops are inserted in the slot. The resin package layer encloses the coil loops and seals the slot, thereby increasing the contact area between the coil loops and the insides of the slot and the efficiency for dissipating heat. The two linear function sides are alternative to each other to reduce the volume required for the coil unit.

U.S. Pat. No. 5,998,890 discloses a linear motor wherein the coil unit defines the shape of the coil loop which has two vertical function sides and two axial non-function sides. The relationship between the coil inside width (CIW) of the vertical function sides, the coil side width (CSW) and the number of phases of the current (#Φ) is expressed by the equation:

CIW=CSW×(#Φ−1).

Because of the shape, the coil loops can be overlapped tightly to reduce the space occupied by the coil unit.

However, along with the demands of higher output and speed for the linear motors, higher current and voltage are input into the linear motor and which generate higher heat and reduce the efficiency of the motor. The coil loops are arranged close to each other so that the heat is difficult to be dissipated and the risk of circuit short becomes high. The specific relationship of CIW=CSW×(#Φ−1) cannot provide extra room for the heat dissipating members or insulation members.

The present invention intends to provide a coil unit for linear motors and improves the shortcomings of the conventional ones.

SUMMARY OF THE INVENTION

The present invention relates to a coil unit which comprises an insulation wire bent continuously to form a loop with a hollow portion. The coil unit comprises two vertical function sides and two axial non-function sides. A bent section is formed adjacent to each of the two axial non-function sides so as to alternatively arrange the multiple coil units by inserting the vertical function side of one coil unit into the hollow portion of the adjacent coil unit to form a coil assembly. Each coil unit has two side areas. The width D1 of the vertical function side is defined from the side area corresponding to the vertical function side. The distance between two respective insides of the two vertical function sides is defined as D2. $D2 = m \times D1 + \Delta L$, wherein the "m" represents the number of the vertical function sides of other coil units received in the vertical direction of the hollow portion. The $\Delta L$ is the width of the gap which receives a separation plate between at least two adjacent vertical function sides.

Preferably, the $\Delta L = \Delta L1 + \Delta L2 + \Delta L3 + \ldots \Delta Ln$, the $\Delta L1$ to $\Delta Ln$ represent that the $\Delta L$ is cut into n gaps and each gap $\Delta L1$ to $\Delta Ln$ is located between any two adjacent vertical function sides 12, and $n \leq m+1$ and n is a positive integer.

Preferably, each gap from $\Delta L1$ to $\Delta Ln$ has the same width.

Preferably, at least one separation plate has a thickness "T" and $T \leq \Delta L$. The at least one separation plate is inserted between the two adjacent vertical function sides in the hollow portion of the coil unit via the side area of the coil unit. The thickness of the separation plate can be T1 to Tn, wherein $T1 = \Delta L1$, $T2 = \Delta L2$, $T3 = \Delta L3 \ldots Tn = \Delta Ln$. The separation plates can be inserted into the smaller gaps from $\Delta L1$ to $\Delta Ln$ between the two adjacent vertical function sides. The separation plate is a heat dissipating plate or an insulation plate. Some of the separation plates are insulation plates and some are heat dissipating plates according to practical needs. Alternatively, the separation plate is made by material which has both insulation and heat dissipating features.

Furthermore, in the definition of the coil unit, $n = m+1$. Each coil unit has a smaller gap which has the width from $\Delta L1$ to $\Delta Ln$ between the two adjacent vertical function sides so as to receive a separation plate therein.

For the user of multiple separation plates, a connection member is connected between the separation plates. The connection member has a first connection plate connected to same sides of the separation plates, so that when the separation plates are inserted between the two adjacent vertical function sides in the hollow portion of the coil unit via the side area of the coil unit. The first connection plate contacts the side area. Alternatively, the connection member has a second connection plate which is connected to opposite sides of the separation plates and contacts the other side area of the coil unit. Furthermore, the connection member has a third connection plate and a fourth connection plate. The separation plates are connected to the third connection plate or the fourth connection plate. The third and fourth connection plates are in contact with the two side area of the coil unit when the separation plates are inserted between the two adjacent vertical function sides of the coil unit. The connection member may have multiple fifth connection plates, and two ends of each separation plate are respectively connected to the adjacent separations by the fifth connection plates so as to form continuous bent sections.

Besides, a heat dissipating member is located beside the coil assembly. Preferably, the heat dissipating member has more than one ventilation hole. The heat dissipating member is integrally formed with the connection member. A resin package layer packs the coil assembly and the separation plates, while the heat dissipating member is exposed from the resin package layer. A base is inserted between the coil assembly and the separation plates. The heat dissipating member is secured to the base. When the coil units are connected alternatively to each other, the length of the overlapped portion of the adjacent vertical function sides is L1, and the length of the separation plate is at least L1. The separation plate is inserted between the overlapped portion between the adjacent vertical function sides. Furthermore, the distance between the two axial non-function sides of the bent coil unit is L2 which is larger than L1. The length of the separation plate is L2.

The coil unit has a distance $\Delta L$ between the two respective insides of the two vertical function sides so that a separation plate is located between two adjacent vertical function sides. The coil unit of the present invention is suitable for iron-less liar motor requires separation plates.

By using the separation plates made by insulation material to increase the linear motor with higher insulation feature and the linear motor can be operated under higher voltage.

By using the separation plates made by heat-conductive material to increase the linear motor with higher heat dissipating feature and the linear motor can be operated under higher current.

The separation plates are made by insulation material to increase the linear motor with higher insulation feature. The separation plates are made by heat-conductive material to increase the linear motor with higher heat dissipating feature. Alternatively, some of the separation plates are made by insulation material and some are made by heat-conductive material to allow the linear motor to have both features.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
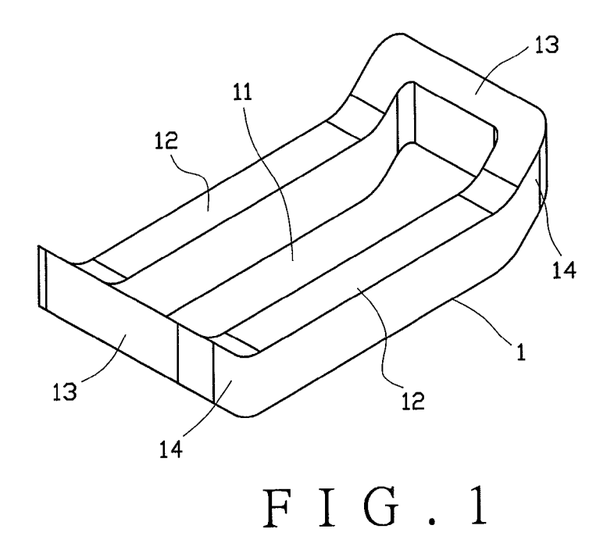
FIG. 1 is a perspective view to show the coil unit of the present invention.
Figure 2:
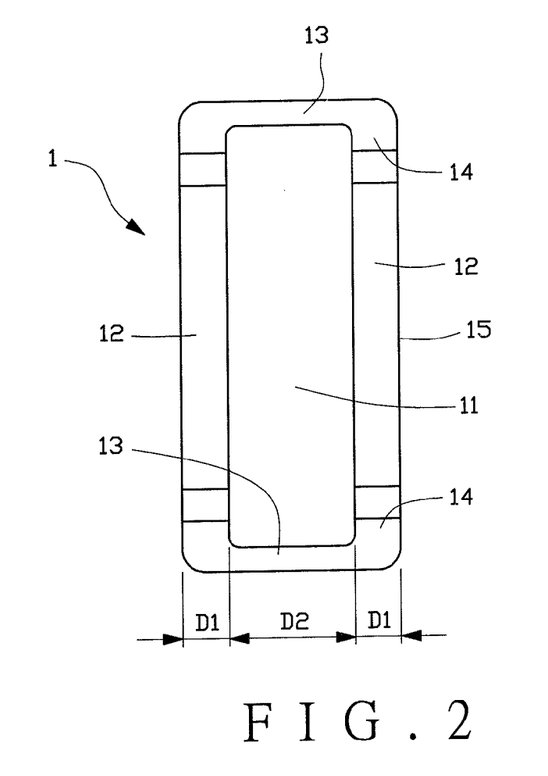
FIG. 2 shows the side area of the coil unit of the present invention.
Figure 3:
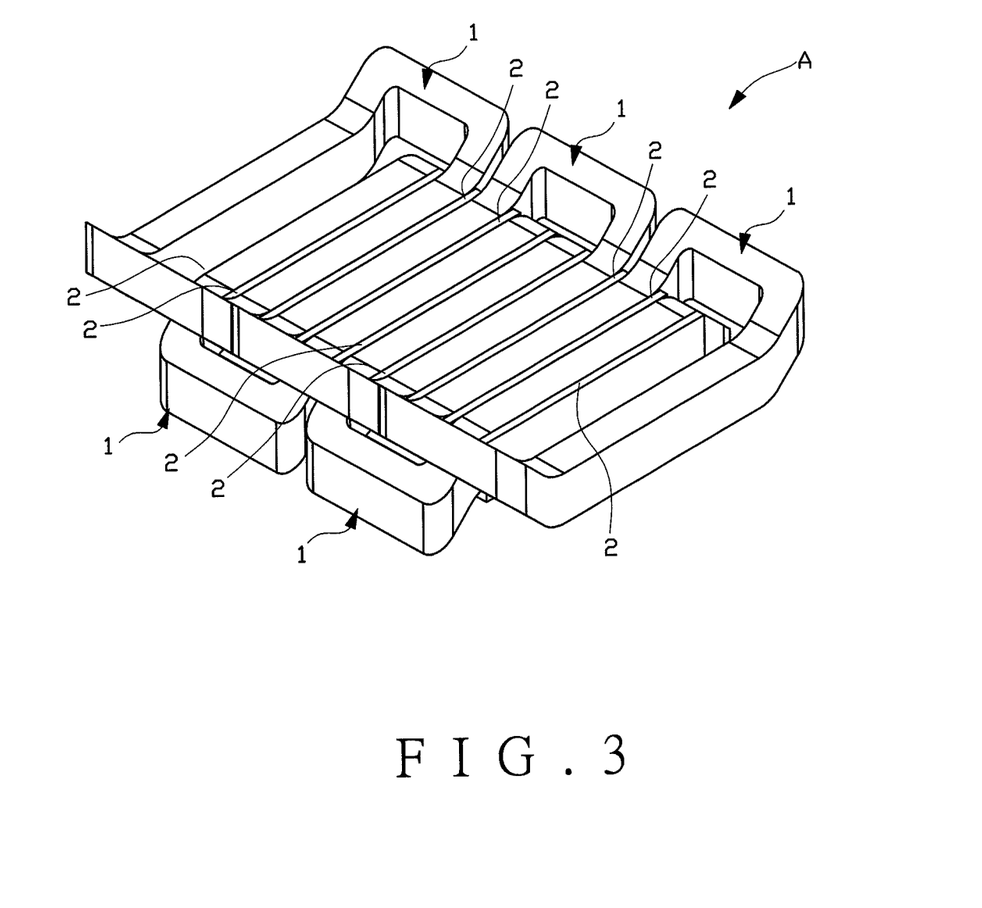
FIG. 3 is a perspective view to show the coil assembly of the present invention.

Referring to FIGS. 1 to 3, the coil assembly "A" of the present invention comprises multiple coil units 1 and each coil unit 1 is formed by bending an insulation wire continuously to form a loop which encloses a hollow portion 11. The coil unit 1 has two vertical function sides 12 and two axial non-function sides 13. A bent section 14 is formed adjacent to each of the two axial non-function sides 13 so as to alternatively arrange the multiple coil units 1 by inserting the vertical function side 12 of one coil unit 1 into the hollow portion 11 of the adjacent coil unit 1. The coil unit 1 has two side areas 15. The width D1 of the vertical function side 12 is defined from the side area 15 corresponding to the vertical function side 12. The distance between two respective insides of the two vertical function sides 12 is defined as D2. D2=m×D1+ $\Delta L$, wherein m represents the number of the vertical function sides of other coil units 1 received in vertical direction of the hollow portion 11. $\Delta L$ is the width of a gap, in this embodiment, the $\Delta L = \Delta L1 + \Delta L2 + \Delta L3 + \ldots \Delta Ln$. $\Delta L1 = \Delta L2 = \Delta L3 = \ldots \Delta Ln$. The $\Delta L1$ to $\Delta Ln$ represent that the $\Delta L$ is cut into n gaps and each gap $\Delta L1$ to $\Delta Ln$ is located between any two adjacent vertical function sides 12, wherein n≤m+1 and n is a positive integer.

Figure 4:
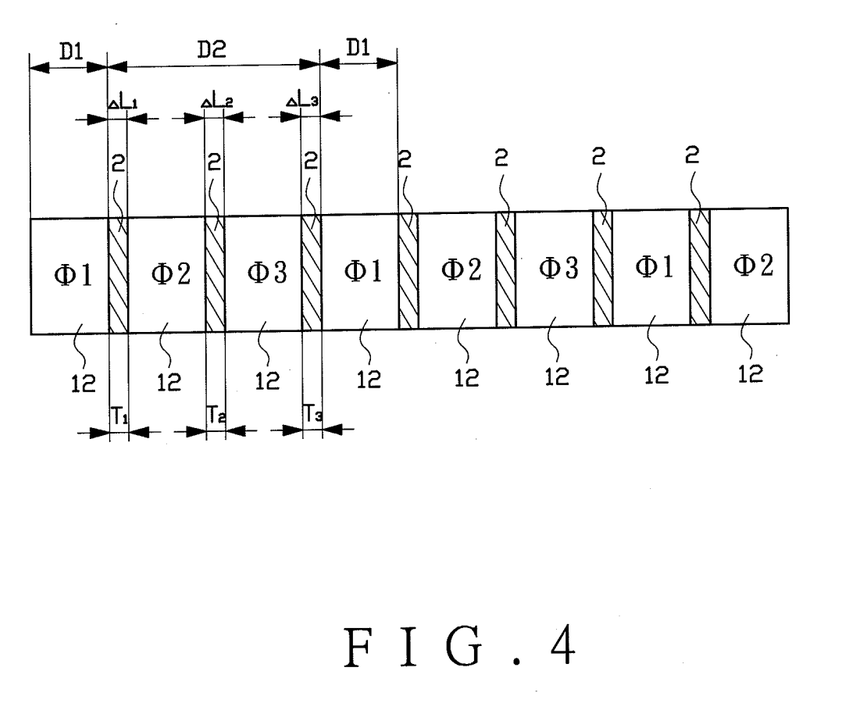
FIG. 4 shows that the present invention is used as a three-phase coil unit, wherein m=2 and n=3.

Multiple separation plates 2 each have a thickness "T" and T≤$\Delta L$. In this embodiment, the thickness of the separation plates 2 is T1 to Tn, wherein T1=$\Delta L1$, T2=$\Delta L2$, T3=$\Delta L3$ ... Tn=$\Delta Ln$. Therefore, T1=T2=T3= ... Tn. The separation plates 2 are inserted into the smaller gaps from $\Delta L1$ to $\Delta Ln$ between the two adjacent vertical function sides 12 in the hollow portions 1 of the coil units 1 via the side areas 15 so as to form the coil assembly. As shown in FIG. 4, the coil assembly "A" is a three-phase coil unit and comprises the first phase Φ1, the second phase Φ2 and the third phase Φ3, wherein m=2 and n=3. This means that the hollow portion 11 of any of the coil units 1 is able to receive the vertical function sides 12 of the adjacent coil units 1, and the separation plate 2 is inserted between the adjacent vertical function sides 12.

Figure 5:
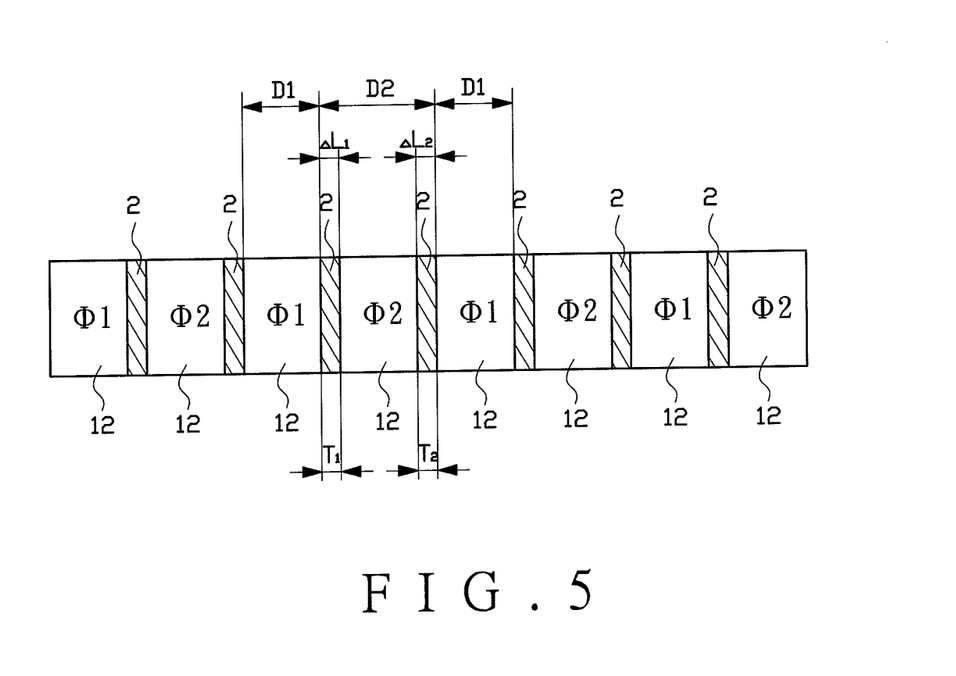
FIG. 5 shows that the present invention is used as a two-phase coil unit, wherein m=1 and n=2.

As shown in FIG. 5, the coil assembly "A" is a two-phase coil unit comprising the first phase Φ1 and the second phase Φ2, wherein m=1 and n=2. This means that the hollow portion 11 of any of the coil units 1 is able to receive the vertical function side 12 of either one of the adjacent coil units 1, and the separation plate 2 is inserted between the adjacent vertical function sides 12.

Figure 6:
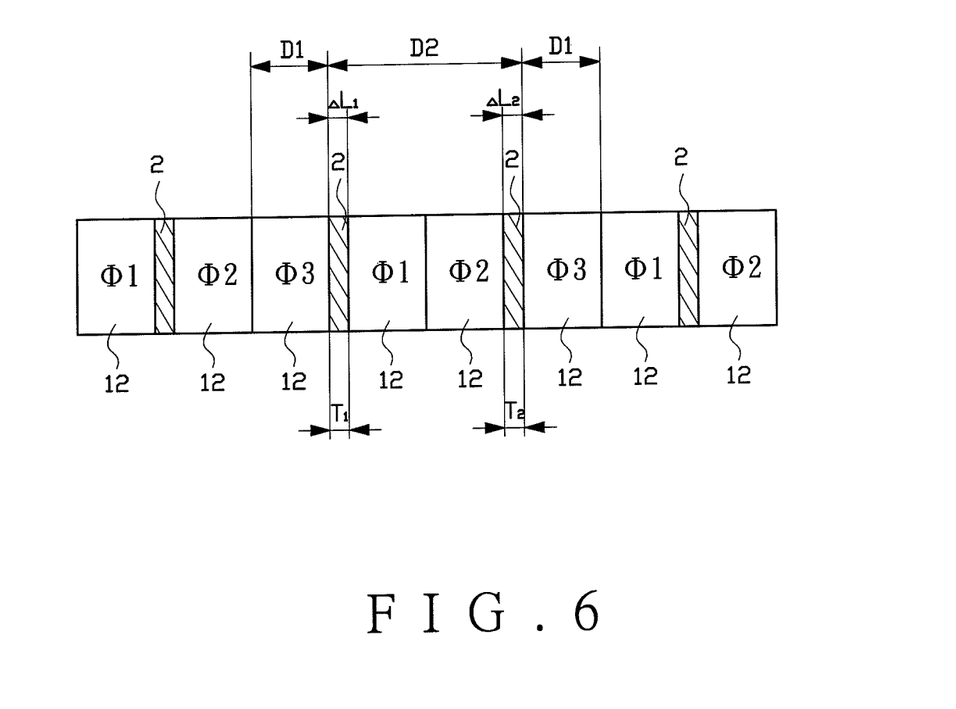
FIG. 6 shows that the present invention is used as a three-phase coil unit, wherein m=2 and n=2.

As shown in FIG. 6, the coil assembly "A" is a three-phase coil unit and comprises the first phase Φ1, the second phase Φ2 and the third phase Φ3, wherein m=2 and n=2. This means that the hollow portion 11 of any of the coil units 1 is able to receive the vertical function sides 12 of the adjacent coil units 1, and the separation plate 2 is inserted between the adjacent vertical function sides 12 of the adjacent coil units 1 and the vertical function side 12 of the coil unit 1 whose hollow portion 11 receiving the two vertical function sides 12 of the adjacent coil units 1. The two vertical function sides 12 of the adjacent coil units 1 are located adjacent to each other.

It is noted that the separation plate 2 is an insulation plate so that when high voltage or current passes through the coil assembly "A", the coil units 1 are insulated to avoid from short between the coil units 1. The insulation material can be resin, insulation film, PI insulation tape, insulation paper sheet, carbon fibers, glass fibers, resin, plastic, or ceramics.

The separation plate 2 is made by heat-conductive material and performs as a heat dissipating plate. When the coil assembly "A" is used at high power, the separation plates 2 bring the heat generated from the coil units 1 away from the coil assembly "A" and to the air or other heat dissipating devices. The heat-conductive material can be aluminum alloy, copper alloy, stainless steel, ceramics or carbon fibers.

Preferably, the separation plates 2 are made by material which has both insulation and heat dissipating features. Alternatively, some of the separation plates 2 are insulation plates and some are heat dissipating plates according to practical needs.

The second embodiment of the present invention further comprises a connection member connected between the separation plates 2.

Figure 7:
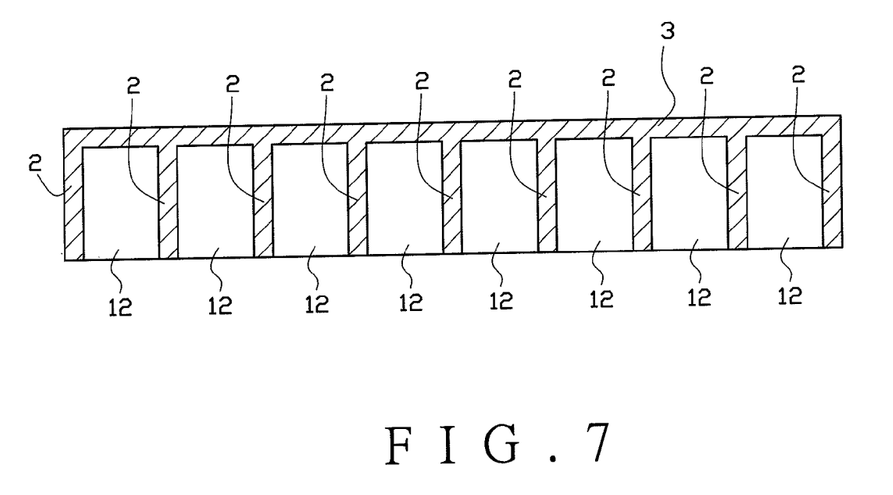
FIG. 7 shows the second embodiment of the present invention, wherein the separation plate is connected with a first connection plate.

As shown in FIG. 7, the connection member has a first connection plate 3 connected to the same sides of the separation plates 2, so that when the separation plates 2 are inserted between the two adjacent vertical function sides 12 in the hollow portion 11 of the coil unit 1 via the side area 15 of the coil unit 1, the first connection plate 3 contacts the side area 15.

Figure 8:
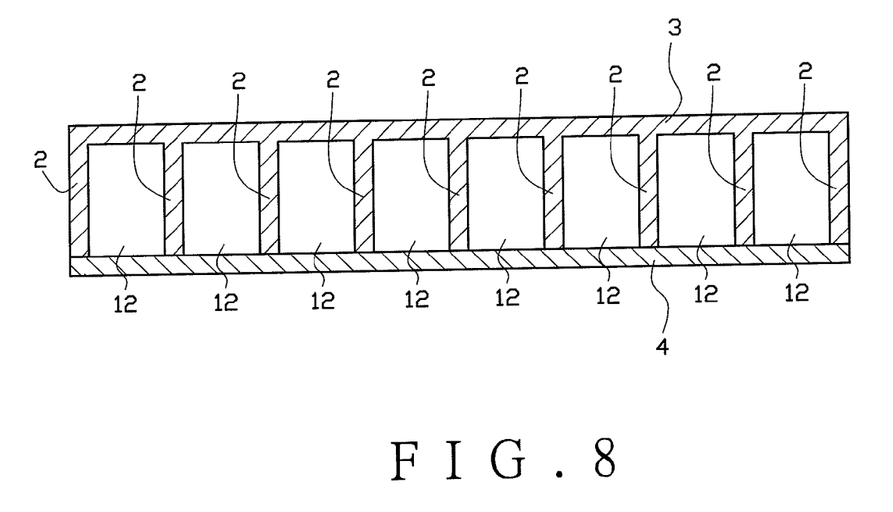
FIG. 8 shows the second embodiment of the present invention, wherein the separation plate is connected with a first connection plate and a second connection plate.

As shown in FIG. 8, the connection member has a first connection plate 3 connected to the same sides of the separation plates 2, so that when the separation plates 2 are inserted between the two adjacent vertical function sides 12 in the hollow portion 11 of the coil unit 1 via the side area 15 of the coil unit 1, the first connection plate 3 contacts the side area 15. The connection member further has a second connection plate 4 which is connected to opposite sides of the separation plates 2 and the other side area 15 of the coil unit 1.

Figure 9:
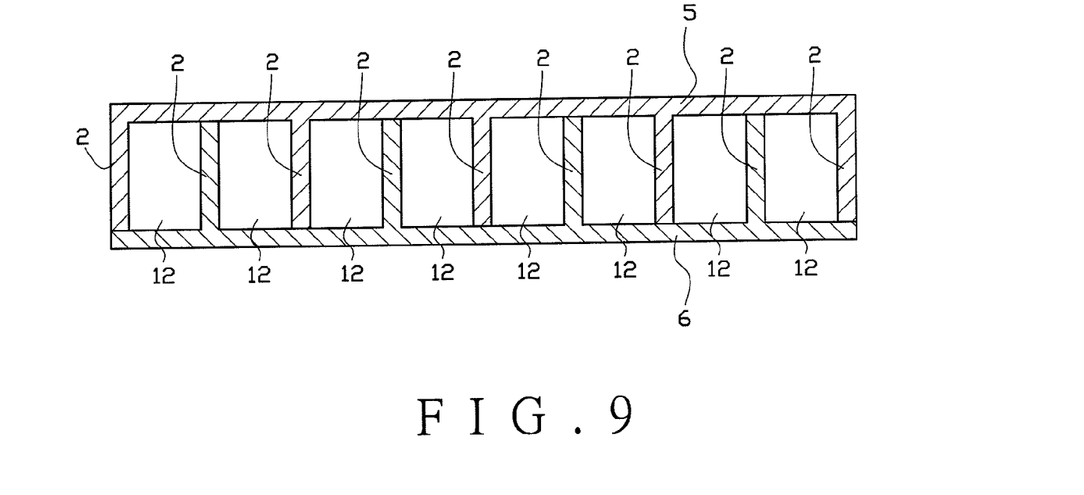
FIG. 9 shows the second embodiment of the present invention, wherein the separation plate is connected with a third connection plate and a fourth connection plate.

FIG. 9 shows that the connection member has a third connection plate 5 and a fourth connection plate 6. The separation plates 2 are connected to the third connection plate 5 or the fourth connection plate 6. The third and fourth connection plates 5, 6 are in contact with the two side area 15 of the coil unit 1 when the separation plates 2 are inserted between the two adjacent vertical function sides 12 of the coil unit 1. In this embodiment, one of any of two adjacent separation plates 2 is connected to the third connection plate 5 and the other separation plate 2 is connected to the fourth connection plate 6.

Figure 10:
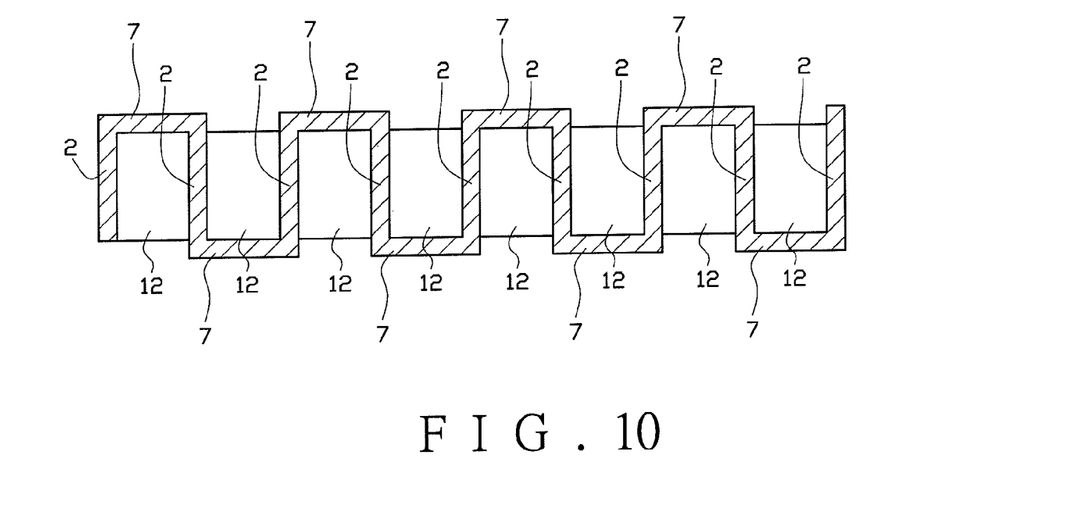
FIG. 10 shows the second embodiment of the present invention, wherein the separation plate is connected with a fifth connection plate.

As shown in FIG. 10, the connection member has multiple fifth connection plates 7. Two ends of each separation plate 2 are respectively connected to the adjacent separation plates 2 by the fifth connection plates 7 so as to form continuous bent sections.

The material of the connection plates are the same as the separation plates 2, thanks to the connection between the connection plates and the separation plate 2, so that the separation plates 2 can be installed one time. The contact area with the insulation material or heat dissipating material between the coil units 1 is increased.

Figure 11:
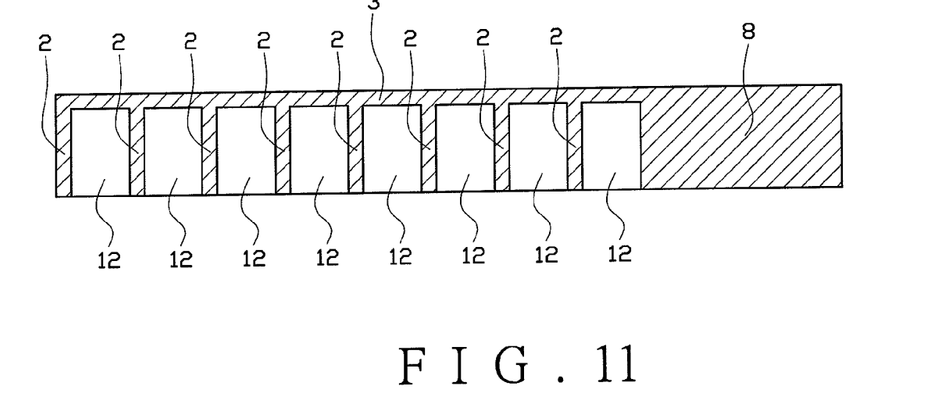
FIG. 11 shows the third embodiment of the present invention, wherein the heat dissipating member is installed to the side of the coil assembly of the present invention.
Figure 12:
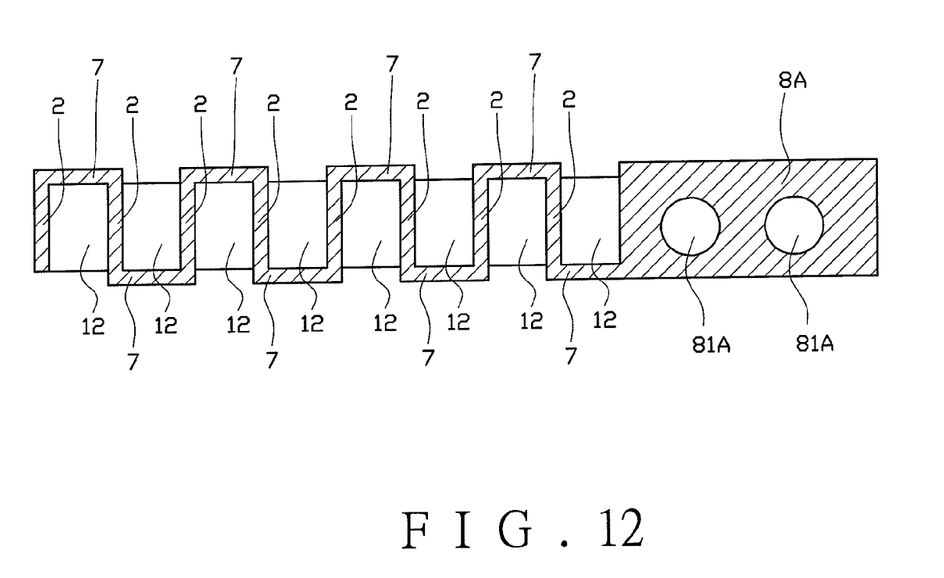
FIG. 12 shows the third embodiment of the present invention, wherein the heat dissipating member has ventilation holes defied therethrough.
Figure 13:
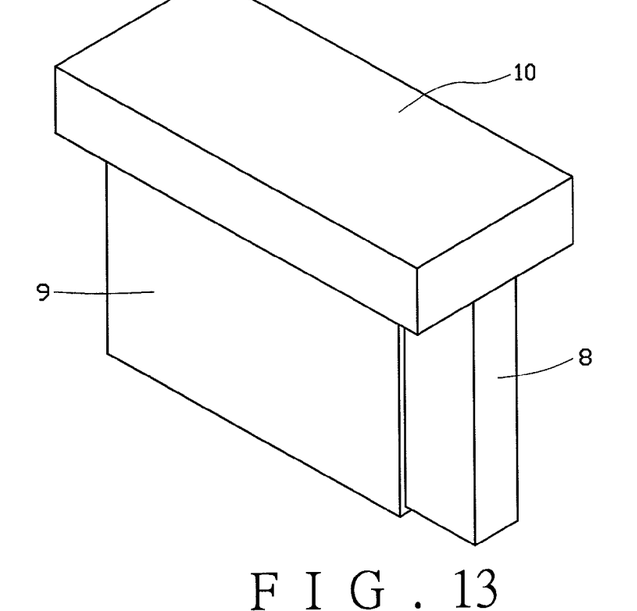
FIG. 13 shows the third embodiment of the present invention, wherein the connection plate and the heat dissipating member are formed and the heat dissipating member is exposed from the resin package layer.
Figure 14:
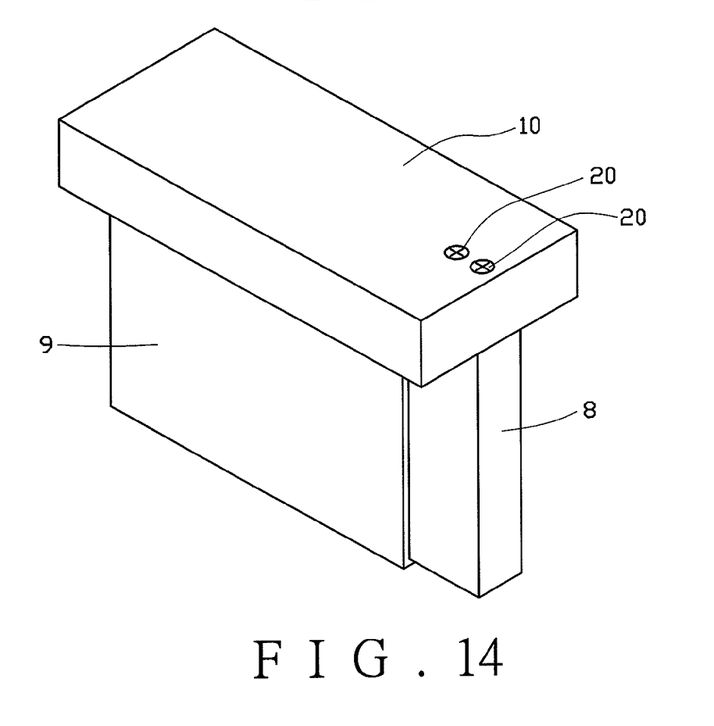
FIG. 14 shows the third embodiment of the present invention, wherein the heat dissipating member exposed from the resin package layer is secured to the base.

FIG. 11 shows the third embodiment, wherein when the separation plates 2 are used as heat dissipating plates, a heat dissipating member 8 is located beside the coil assembly "A" so as to quickly bring the heat generated from the coil units 1 into air. As shown in FIG. 12, a heat dissipating member 8A is located beside the coil assembly "A", the heat dissipating member 8A has more than one ventilation hole 81A to increase the contact area with air to increase the efficiency for dissipating heat. As shown In FIG. 13, the heat dissipating member 8 is integrally formed with the connection member. A resin package layer 9 packs the coil assembly "A" and the separation plates 2. The heat dissipating member 8 is exposed from the resin package layer 9. As shown in FIG. 14, because the coil assembly moves along the rail of the stator at high speed, in order to prevent the heat dissipating member 8 from shaking, a base 10 is inserted between the coil assembly "A" and the separation plates 2, and the heat dissipating member 8 is secured to the base 10.

Figure 15:
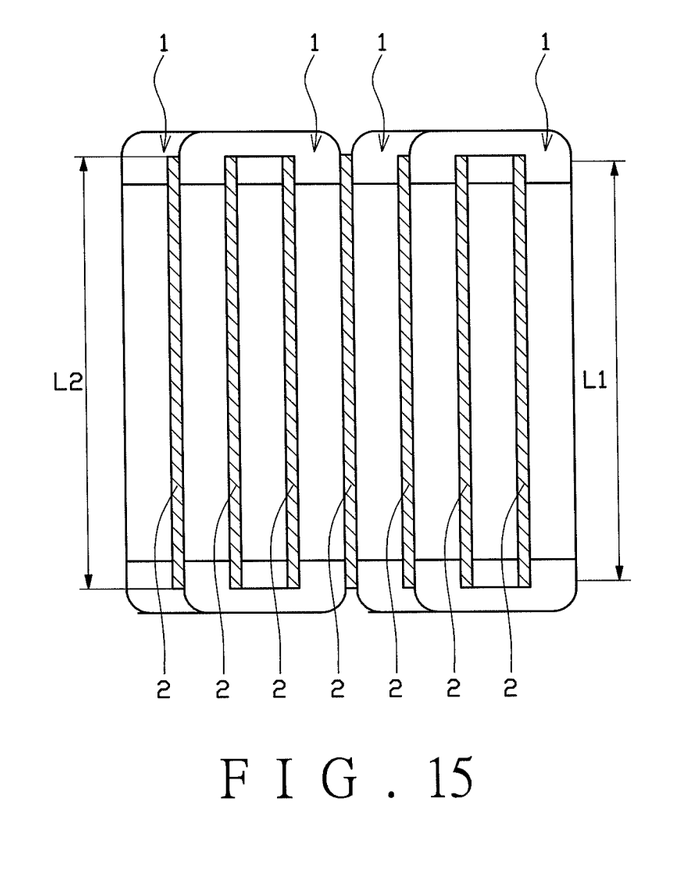
FIG. 15 shows the fourth embodiment of the present invention, wherein the length of the separation plate is the same as the distance between the two axial non-function sides of the bent coil unit, the separation plate is used as the insulation plate.
Figure 16:
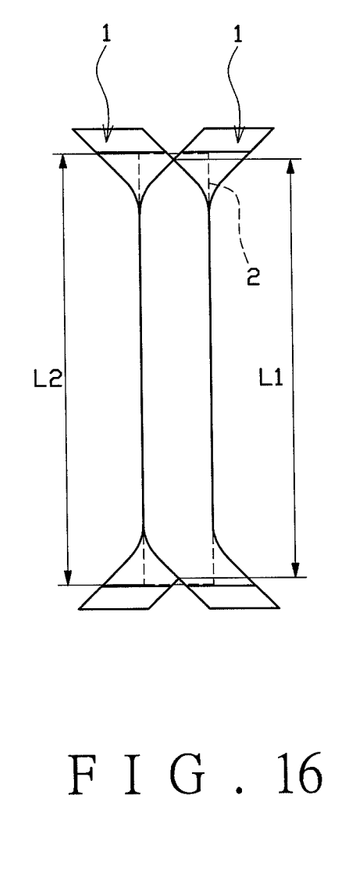
FIG. 16 is a side view of the disclosure in FIG. 15.

FIGS. 15 and 16 show the fourth embodiment, wherein when the coil units 1 are connected alternatively to each other, the length of the overlapped portion of the adjacent vertical function sides 12 is L1, and the length of the separation plate 2 is at least L1, and the separation plate 2 is inserted between the overlapped portion between the adjacent vertical function sides 12. In this embodiment, the distance between the two axial non-function sides 13 of the bent coil unit 1 is L2 which is larger than the L1. When the separation plate 2 is used as the insulation plate, the length of the separation plate 2 is L2, because the insulation feature at the bent portion of the conductive wire of the coil unit 1 tends to fail, so that the separation plate 2 extends to the axial non-function sides 13 to reinforce the insulation feature at the bent portion.

While we have shown and described the embodiment in accordance with the present invention, it should be clear to those skilled in the art that further embodiments may be made without departing from the scope of the present invention.

What is claimed is:

1. A coil assembly unit comprising:
   a plurality of coil units each comprising:
      an insulation wire bent continuously to form a loop which encloses a hollow portion, each coil unit having two vertical function sides and two axial non-function sides, a bent section formed adjacent to each of the two axial non-function sides so as to alternatively arrange the plurality of coil units by inserting the vertical function side of one coil unit into the hollow portion of the adjacent coil unit, the each coil unit having two side areas, a width D1 of the vertical function side being defined from the side area corresponding to the vertical function side, a distance between two respective insides of the two vertical function sides being defined as D2, $D2 = m \times D1 + \Delta L$, wherein m represents a number of the vertical function sides of other coil units received in a vertical direction of the hollow portion, $\Delta L$ being a width of a gap which receives a separation plate between at least two adjacent vertical function sides; and
   a coil assembly having the coil units which are alternatively connected to each other by inserting the vertical function side of one coil unit into the hollow portion of the adjacent coil unit;
   wherein each said separation plate having a thickness T and $T \leq \Delta L$ and is inserted between the two adjacent vertical function sides in the hollow portion of a corresponding coil unit via the side area of the corresponding coil unit.

2. The assembly as claimed in claim 1, wherein each said separation plate is a heat dissipating plate.

3. The assembly as claimed in claim 1, wherein each said separation plate is an insulation plate.

4. The assembly as claimed in claim 1, wherein some of the separation plates of the coil units are insulation plates and some are heat dissipating plates.

5. The assembly as claimed in claim 1, wherein each said separation plate is made of a material which has both insulation and heat dissipating features.

6. The assembly as claimed in claim 1 further comprising a connection member is connected between the separation plates.

7. The assembly as claimed in claim 6, wherein the connection member has a first connection plate connected to same sides of the separation plates, so that when the separation plates are respectively inserted between the two adjacent vertical function sides in the hollow portion of the respective coil units via the side area of the coil unit, the first connection plate contacts the side area.

8. The assembly as claimed in claim 7, wherein the connection member has a second connection plate which is connected to opposite sides of the separation plates and contacts the other side area of the coil unit.

9. The assembly as claimed in claim 6, wherein the connection member has a third connection plate and a fourth connection plate, the separation plates are connected to the third connection plate or the fourth connection plate, the third and fourth connection plates are in contact with the two side area of the coil unit when the separation plates are inserted between the two adjacent vertical function sides of the coil unit.

10. The assembly as claimed in claim 6, wherein the connection member has multiple fifth connection plates, two ends of each separation plate are respectively connected to the adjacent separation plates by the fifth connection plates so as to form continuous bent sections.

11. The assembly as claimed in claim 6 further comprising a heat dissipating member which is located beside the coil assembly.

12. The assembly as claimed in claim 11, wherein the heat dissipating member has more than one ventilation hole.

13. The assembly as claimed in claim 11, wherein the heat dissipating member is integrally formed with the connection member, a resin package layer packs the coil assembly and the separation plates, the heat dissipating member is exposed from the resin package layer.

14. The assembly as claimed in claim 13, wherein a base is inserted between the coil assembly and the separation plates, the heat dissipating member is secured to the base.

15. The assembly as claimed in claim 1, wherein when the coil units are connected alternatively to each other, a length of an overlapped portion of the adjacent vertical function sides is L1, the length of the at least one separation plate is at least L1 and the at least one separation plate is inserted between the overlapped portion between the adjacent vertical function sides.

16. The assembly as claimed in claim 15, wherein a distance between the two axial non-function sides of the bent coil unit is L2 which is larger than the L1, the length of the at least one separation plate is L2.

17. The coil unit as claimed in claim 1, wherein the $\Delta L=\Delta L1+\Delta L2+\Delta L3+\ldots \Delta Ln$, the $\Delta L1$ to $\Delta Ln$ represent that the $\Delta L$ is cut into n gaps and each gap $\Delta L1$ to $\Delta Ln$ is located between any two adjacent vertical function sides, $n \leq m+1$ and n is a positive integer.

18. The coil unit as claimed in claim 17, wherein each gap from $\Delta L1$ to $\Delta Ln$ has the same width.

19. The coil unit as claimed in claim 17, wherein $n=m+1$.

* * * * *